Figure 5:
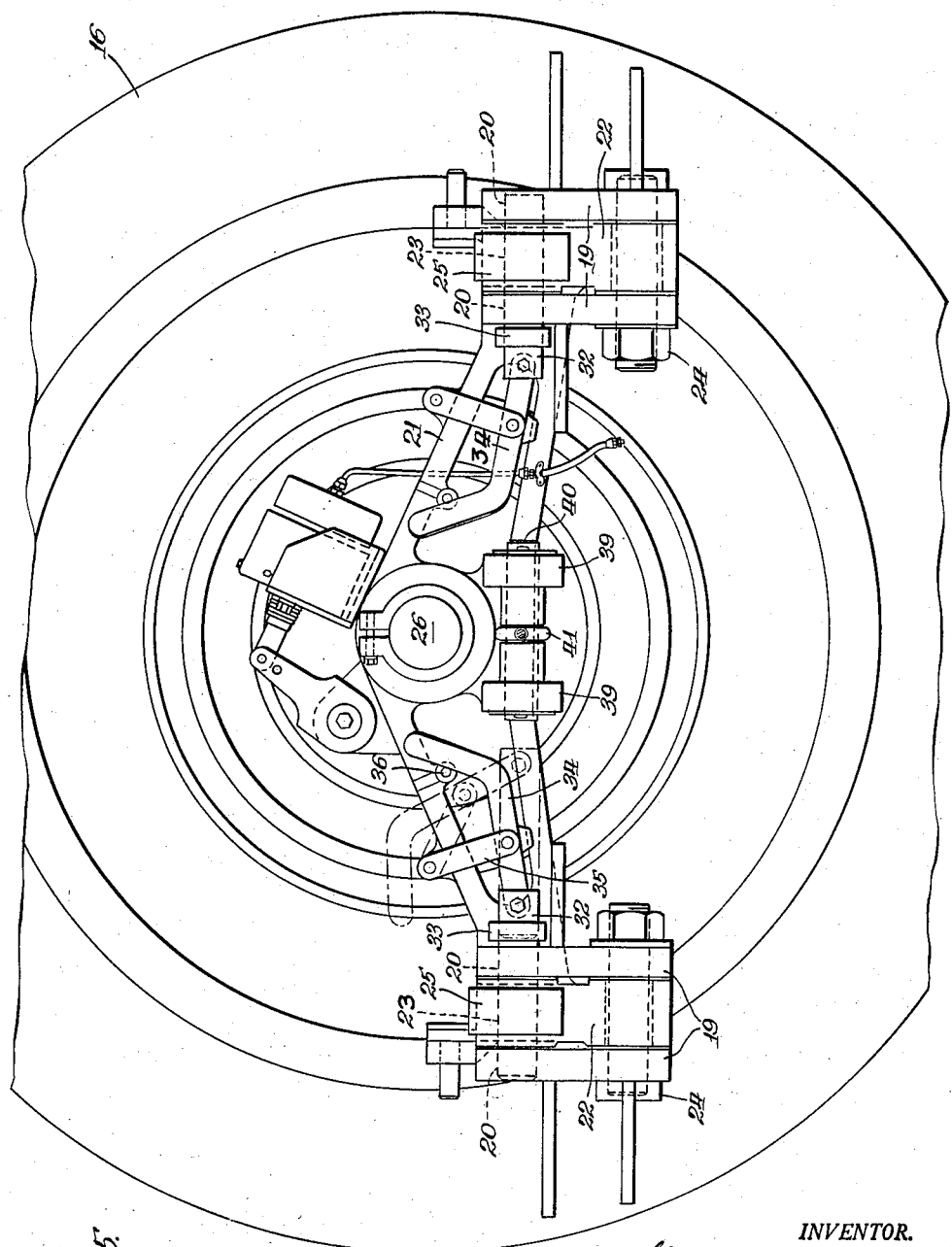

May 12, 1959  G. L. FRENCH  2,886,338
FOLDABLE WHEEL MOUNTING FOR VEHICLES
Filed Dec. 31, 1956  3 Sheets-Sheet 1
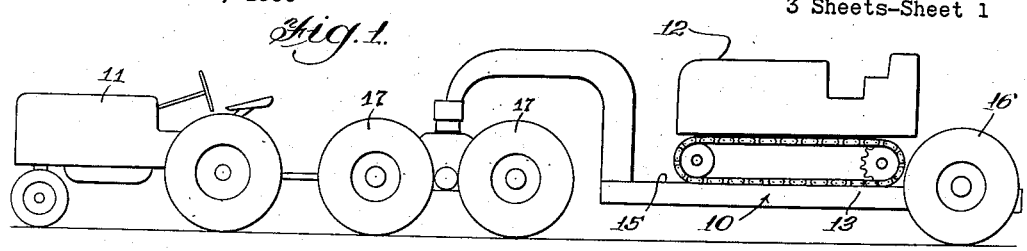
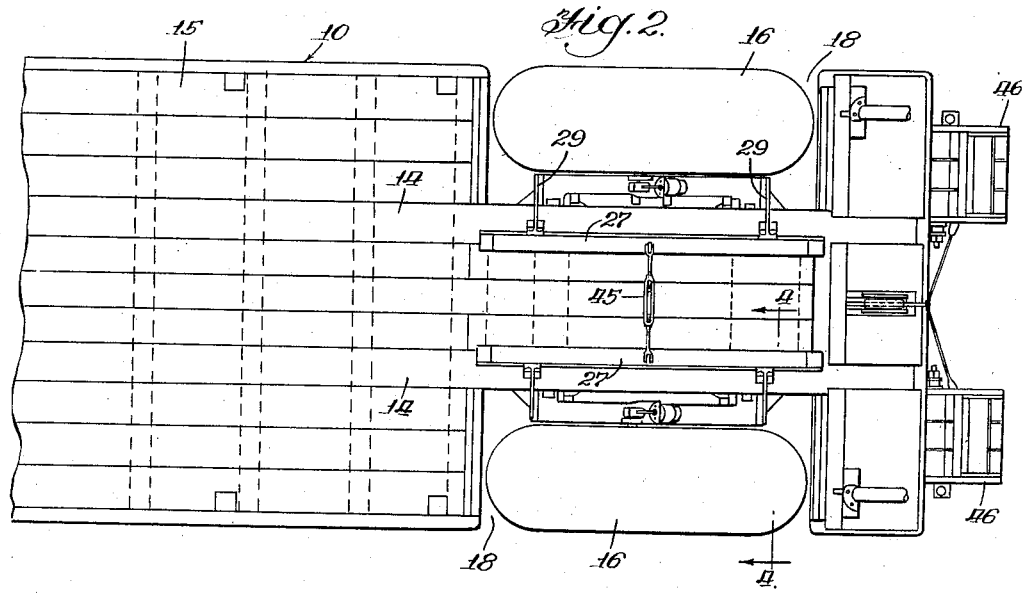
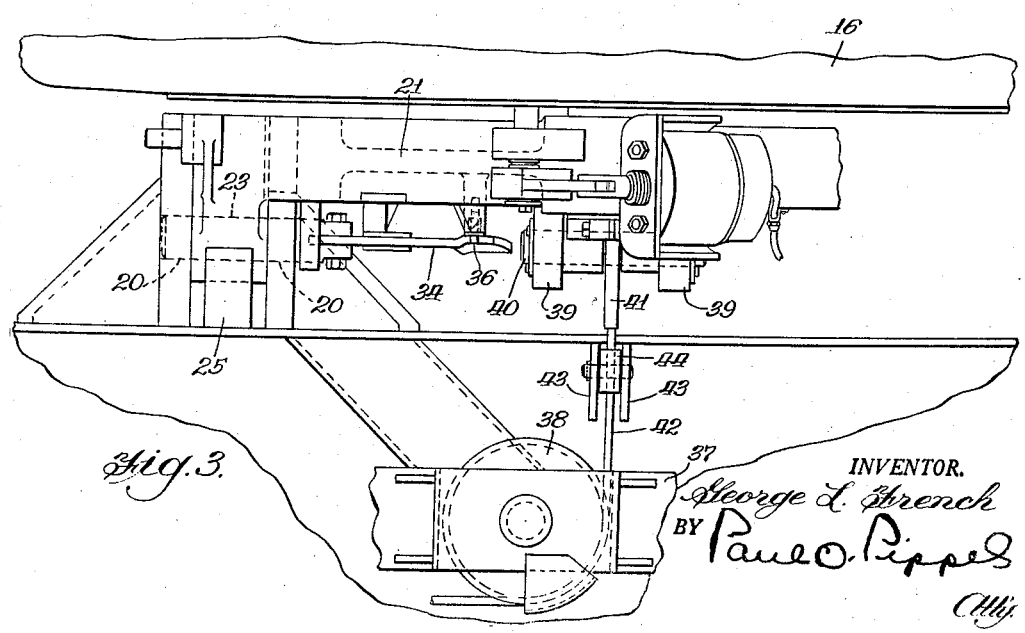
INVENTOR.
George L. French
BY Paul O. Pipps
Atty.

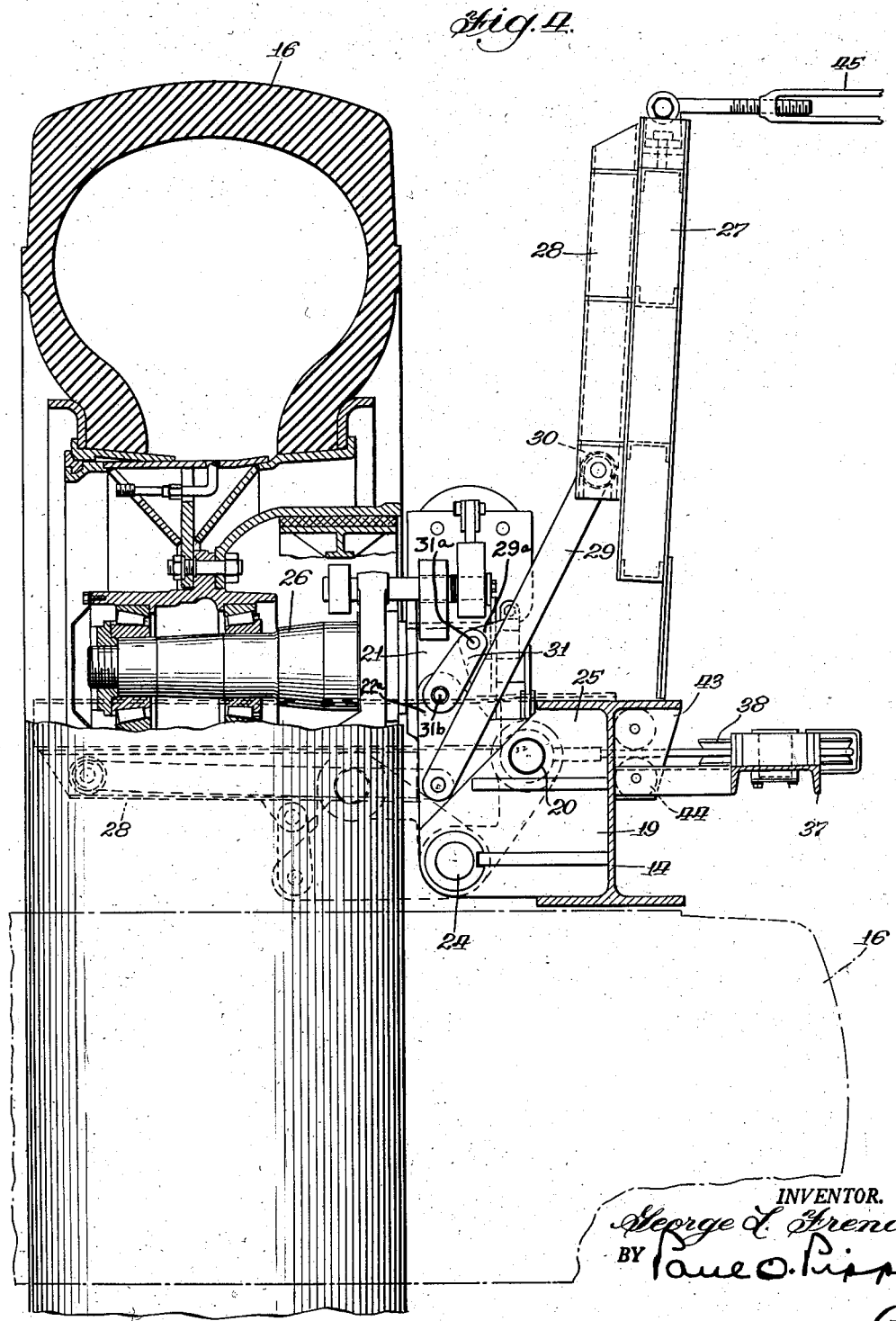

May 12, 1959  G. L. FRENCH  2,886,338
FOLDABLE WHEEL MOUNTING FOR VEHICLES
Filed Dec. 31, 1956  3 Sheets-Sheet 3

INVENTOR.
George L. French
BY Paul O. Pippel
Atty.

United States Patent Office 2,886,338
Patented May 12, 1959

2,886,338

FOLDABLE WHEEL MOUNTING FOR VEHICLES

George L. French, Albuquerque, N. Mex., assignor to International Harvester Company, a corporation of New Jersey Application December 31, 1956, Serial No. 631,589

9 Claims. (Cl. 280—40)

This invention relates to vehicles for carrying large objects and is primarily concerned with a wheel mounting so that the wheels of the vehicle can be moved to an out of the way position while the object is being loaded on the vehicle.

An object of the invention is to provide a wheel mounting for a vehicle with wheels disposed in wells in the bed of the vehicle and projecting above the bed and a cover pivotally mounted on the bed and operatively connected to the wheel mounting and the wheels being movable from the vertical position to a horizontal position below the bed and the cover moving with the wheel from a substantially vertical position to a horizontal position over the well to allow a vehicle to be loaded on the first named vehicle by being moved over the cover.

Another object of the invention is to provide a novel mechanism between a wheel mounting and a wheel well cover so that the cover is moved with the wheel from vertical to horizontal position and vice versa.

Another object of the invention is to provide novel releasable means for a wheel mounting for holding a wheel in a vertical position and for releasing the wheel so that it may be moved to a horizontal position.

A further object of the invention is to provide novel means for moving a wheel from a horizontal position to a vertical position.

The foregoing and other objects of the invention will be apparent from the construction and arrangement illustrated in the accompanying drawings wherein:

Figure 1 is a side elevational view of a semi-trailer and a tractor connected to the trailer and a crawler tractor disposed on the trailer, Figure 2 is a fragmentary top plan view of the rear portion of the semi-trailer, Figure 3 is a top plan view of one of the wheel mountings and showing the adjacent portion of the trailer and the adjacent portion of the wheel, Figure 4 is a vertical sectional view taken on the line 4—4 of Figure 2, and Figure 5 is an inside side elevational view of one of the wheel mountings and showing the adjacent portion of the wheel.

Excavating and other kinds of contractors after finishing up a project in one state may desire to move their equipment to another state to begin another project. Crawler tractors present a problem because they cannot be driven on highways and other roads since they would damage the highway and the use of any tractors on highways other than those with rubber tires generally is prohibited. The contractor may want to move the crawler tractor only a short distance but he cannot drive it across highways. So loading the crawler tractor on a rubber tired vehicle is an ideal way to transport it whether over long or short distances. However, the wheels on these rubber tired vehicles generally project above the bed of the vehicle and the crawler tractor is about as wide as the bed of the vehicle. The crawler tractor has to be driven up ramps at the rear end of the vehicle and then lifted up over the wheels onto the bed of the vehicle. This way is difficult and inconvenient. Applicant has provided a wheel mounting so that the wheels can be moved from the vertical position to a horizontal position below the bed of the vehicle. Covers are then moved to a horizontal position over the wells previously occupied by the wheels and then the crawler tractor is driven up ramps and over the wheel covers to a position on the bed clear of the wheel covers. After the crawler tractor is on the vehicle the wheels may be moved back to the vertical position and the crawler tractor transported to its destination.

As stated above the invention proposes a wheel mounting for vehicles. The vehicle has a bed provided with a pair of opposed wheel wells each extending inwardly from opposite sides thereof. Each wheel mounting is comprised of a support disposed in the respective well and extending longitudinally of the bed and pivotally mounted on the bed. A stub shaft is arranged at right angles with the support and is fixedly secured thereto and a wheel is mounted on the stub shaft. A cover is disposed adjacent each well and has one side pivotally mounted on the bed and the cover is also operatively connected to the support. Releaseable means are provided which engage the support and hold the wheel in a vertical position. The wheel moves from a vertical position to a horizontal position below the bed by gravity upon release of the releasable means and the cover moves to a horizontal position to cover the well to allow a vehicle to be loaded on the first named vehicle by being moved over the cover. A cable is connected to the support and the wheel may be moved from a horizontal to a vertical position upon exerting a pull on the cable.

In the drawings, 10 generally designates a semi-trailer connected to a tractor 11 and a crawler tractor 12 is adapted to be carried by the trailer. The trailer 10 has a bed 13 including longitudinal I-beams 14 and a floor 15 with the upper flanges of the beams forming part of the floor. The trailer 10 has rear wheels 16 and front wheels 17 and the bed 13 has a pair of opposed wheel wells 18 each extending inwardly from opposite sides thereof in which the rear wheels are disposed. Since the wheel mountings are identical only one will be described. A pair of spaced pairs of spaced plates 19 are disposed adjacent the well 18 and are fixedly secured to the bed 13 by being welded to the web and flanges of the respective beam 14 and gusset plates are welded to the plates 19 and to the web of the respective beam. Each pair of plates 19 is provided with aligned openings 20. A generally triangular-shaped support 21 is disposed in the well 18 and extends longitudinally of the bed 13 and is normally disposed in a vertical position. The support 21 has a pair of spaced sections 22 disposed at right angles to the support and integrally secured to the ends thereof and these sections are provided with aligned openings 23 and each section is disposed between the respective pair of plates 19 and is pivotally mounted on the plates by a bolt and nut assembly 24 extending through the respective pair of plates and the respective section. A stop 25 is disposed between each pair of plates 19 and is welded to the web of the respective beam 14 and the adjacent section 22 bears against the stop when the wheels 16 are in a vertical position. A stub shaft 26 is arranged at right angles to the support 21 and clamped and keyed therein so that it will not rotate. The wheel 16 is rotatably mounted on the stub shaft 26 by means of roller bearings as shown in Figure 4. A cover 27 for the well 18 is positioned longitudinally of the bed 13 and has one side pivotally mounted thereon. The cover 27 has a pair of spaced hinge leafs and a pair of plates are disposed at opposite edges of each hinge leaf and welded to the web of the beam 14 and a pin extends through each pair of plates and the respective hinge leaf to pivotally mount one side of the cover 27 on the bed 13. The cover 27 is comprised of a large flat plate and a smaller plate welded to the large flat plate along the pivotally mounted side of the cover and four spaced channels are welded to the large flat plate and another flat plate is welded to the channels. A pair of spaced pairs of spaced members 28 in the form of channels are disposed transversely of each cover 27 and welded thereto and gusset plates are welded to the channels and the cover. A connecting bar 29 is provided for each pair of members 28 and each bar has one end pivotally connected to one of the sections 22 by means of a pin, the sections 22 in turn being connected to the bed 13 by means of the spaced plates 19. A pin extends through the other end of each bar 29 and a pair of rollers 30 are rotatably mounted on the pin and the rollers on each bar are disposed in the guideway formed by the respective pair of members 28. An extension 29a is welded to each bar 29 intermediate its ends and an extension 22a is welded to each section 22 and a pair of spaced links 31 are disposed on opposite faces of the first and second named extensions and pins 31a and 31b extend through the links and extensions to pivotally connect the links to the respective bar and to pivotally connect the links to the respective section. A pin 32 is provided for each pair of plates 19 and the respective section 22 between the plates and each pin has a collar 33 thereon adapted to engage the adjacent plate 19 so that the pin can be operated properly. A handle 34 is provided for each pin and has one end pivotally connected to the pin. An extension is provided on the upper surface of the support 21 adjacent the respective section 22 and a link 35 is provided for each handle 34 and the link has one end pivotally connected to the extension and has its other end pivotally connected to the handle intermediate the ends thereof. Each pin 32 projects through the openings 20 and 23 in each pair of plates 19 and the respective section 22 to hold the respective wheel 16 in a vertical position. An extension is provided on the support 21 adjacent the respective link 35 and a pin 36 is mounted in this extension for horizontal sliding movement. Each pin 36 provides a means on the support 21 engageable with the respective handle 34 to prevent the respective pin 32 from moving out of the openings 20 and 23 in each pair of plates 19 and the respective section 22. An inverted channel 37 is fixedly mounted in the bed 13 and an inverted bracing channel is welded to the respective channel 37 and is also welded to the web of the respective beam 14. A sheave 38 is disposed in a horizontal plane adjacent each well 18 and is rotatably supported in the bed 13 by means of a pin and bolt arrangement extending through the respective channel 37. A pair of spaced mounting pieces 39 are fixedly secured to the support 21 centrally thereof and a pin 40 extends through the mounting pieces and a pair of spaced sleeves are disposed on the pin and keys extending through each end of the pin prevent the pin from sliding out of the mounting pieces. A cable holder 41 is disposed on the pin 40 between the sleeves and a cable 42 is fixedly secured to the holder and this cable is passed around the respective sheave 38. A pair of spaced plates 43 are disposed at opposite sides of the cable 42 and are welded to the respective beam 14 and a pair of vertically aligned spaced wheels 44 are rotatably supported in the plates. The cable 42 is passed through an opening in the web of the beam 14 and between the wheels 44 and the wheels help the cable stay centrally of the sheave 38 and also aid in the smooth operation of the cable. The cable 42 is connected to a winch on the tractor. The covers 27 are held in a substantially vertical position by threaded rods pivotally connected to the nonhinged sides of the covers and a turnbuckle 45 threaded on the rods. A pair of spaced ramps 46 are mounted on the rear end of the bed 13 of the trailer and these ramps have a retracted position and an extended position.

The mode of operation of the wheel mounting arrangement is as follows: The wheels 16 will normally be in a vertical position. Let us assume that it is desired to load a crawler tractor 12 on the trailer 10. Runners are mounted beneath the bed 13 and these runners are normally retracted up against the lower surface of the bed but may be extended to raise the bed so that the wheels 16 are spaced from the road surface. First the runners are extended to lift the bed 13 so that the wheels 16 are spaced above the road surface. Then the turnbuckle 45 is unscrewed from the rods and pins 36 slid outwardly of the trailer 10 so as to be disengaged from the handles 34. The handles 34 are then moved toward each other and then upwardly to the position shown in dotted lines in Figure 5 so that the pins 32 are moved out of the openings 20 and 23 in plates 19 and section 22. This causes the wheel mounting to be released and the wheel 16 falls by gravity from a vertical position to a horizontal position below the bed 13. Since the wheel mounting is connected to the cover 27 through bars 29 the cover 27 is moved downwardly with the wheel mounting with the rollers 30 rolling in the channels 28 from adjacent ends of the channels to the other ends of the channels during the time that the cover moves from a substantially vertical position to a horizontal position and the bars swing about their pivots. During this movement links 31 and sections 22 move from the solid line position in Figure 4 to the dotted line position in Figure 4. The covers 27 are now disposed in a horizontal position over the wheel wells 18. The ramps 46 are moved to an extended position and the crawler tractor 12 driven up the ramps over the wheel well covers 27 to a position on the bed 13 of the trailer clear of the wheel well covers. The wheels 16 are now moved from the horizontal position to the vertical position by exerting a pull on the respective cable 42. The pins 32 are then moved into the openings 20 and 23 in the plates 19 and the respective section 22 and the pins 36 moved inwardly of the trailer to engage the handles 34. The moving of the wheels 16 from horizontal to vertical position causes the covers 27 to be raised to substantially vertical position. The turnbuckle 45 is then threaded on the rods. The runners are then retracted up against the bed 13 of the trailer and this lowers the wheels 16 onto the road surface. The ramps 46 are retracted and the crawler tractor 12 is then transported to its destination. After reaching its destination the crawler tractor 12 is unloaded from the trailer 10 in a reverse manner.

From the foregoing it will be seen that there has been provided a wheel mounting wherein the wheel and wheel well covers may be moved to a horizontal position at the same time upon movement of the wheel to provide a quick and easy way of loading a vehicle on a vehicle so that the first named vehicle can be transported.

What is claimed is:

1. In a vehicle, a bed provided with a pair of opposed wheel wells each extending inwardly from opposite sides thereof, two spaced pairs of spaced plates disposed adjacent each well and fixedly secured to the bed and each pair of plates being provided with aligned openings, a support disposed in each well and extending longitudinally of the bed and having a pair of spaced sections disposed at right angles to the support and secured thereto and the sections being provided with aligned openings and each section being disposed between the respective pair of plates and pivotally mounted on the plates, a stub shaft arranged at righ angles with each support and fixedly secured thereto, a wheel mounted on each stub shaft, a cover for each well positioned longitudinally of the bed and pivotally mounted thereon, spaced members disposed transversely of the respective cover and secured thereto and forming a pair of spaced guideways extending transversely of the cover, a bar for each guideway and having one end pivotally connected to the bed and having its other end movably disposed in the respective guideway and operatively connected to the respective section, and releasable means for each pair of plates and the respective section movably supported on the respective support, each releasable means projecting through the openings in each pair of plates and the respective section to hold the respective wheel in a vertical position and the wheels being movable to a horizontal position under the bed upon the releasable means being removed from the openings in the plates and sections and the covers moving to a horizontal position to cover the wells to allow a vehicle to be loaded on the first named vehicle, by being moved over the covers.

2. In a vehicle, a bed provided with a pair of opposed wheel wells each extending inwardly from opposite sides thereof, two spaced pairs of spaced plates disposed adjacent each well and fixedly secured to the bed and each pair of plates being provided with aligned openings, a support disposed in each well and extending longitudinally of the bed and having a pair of spaced sections disposed at right angles to the support and secured thereto and the sections being provided with aligned openings and each section being disposed between the respective pair of plates and pivotally mounted on the plates, a stub shaft arranged at right angles with each support and fixedly secured thereto, a wheel mounted on each stub shaft, a cover for each well positioned longitudinally of the bed and pivotally mounted thereon, two spaced pairs of spaced members disposed transversely of the respective cover and secured thereto, a bar for each pair of members and having one end pivotally connected to the bed and having its other end movably disposed between the respective pair of members and operatively connected intermediate its ends to the respective section, a pin for each pair of plates and the respective section, and a handle for each pin pivotally connected to the respective pin and movably connected to the respective support, each pin projecting through the openings in each pair of plates and the respective section to hold the respective wheel in a vertical position and the wheels being movable to a horizontal position under the bed upon the pins being removed from the openings in the plates and sections and the covers moving to a horizontal position to cover the wells to allow a vehicle to be loaded on the first named vehicle, by being moved over the covers.

3. In a vehicle, a bed provided with a pair of opposed wheel wells each extending inwardly from opposite sides thereof, two spaced pairs of spaced plates disposed adjacent each well and fixedly secured to the bed and each pair of plates being provided with aligned openings, a support disposed in each well and extending longitudinally of the bed and having a pair of sections disposed at right angles to the support and secured to the ends thereof and the sections being provided with aligned openings and each section being disposed between the respective pair of plates and pivotally mounted on the plates, a stub shaft arranged at right angles with each support and fixedly secured thereto, a wheel mounted on each stub shaft, a cover for each well positioned longitudinally of the bed and pivotally mounted thereon, two spaced pairs of spaced members disposed transversely of each cover and secured thereto, a bar for each pair of members and having one end pivotally connected to the bed and having its other end movably disposed between the respective pair of members and operatively connected intermediate its ends to the respective section, a pin for each pair of plates and the respective section, a handle for each pin pivotally connected to the respective pin and movably connected to the respective support, each pin projecting through the openings in each pair of plates and the respective section to hold the respective wheel in a vertical position, and means on each support engageable with the respective handle to prevent the respective pin from moving out of the openings in the plates and the respective section, the wheels being movable to a horizontal position under the bed upon the pins being removed from the openings in the plates and sections and the covers moving to a horizontal position to cover the wells to allow a vehicle to be loaded on the first named vehicle, by being moved over the covers.

4. In a vehicle, a bed provided with a pair of opposed wheel wells each extending inwardly from opposite sides thereof, two spaced pairs of spaced plates disposed adjacent each well and fixedly secured to the bed and each pair of plates being provided with aligned openings, a support disposed in each well and extending longitudinally of the bed and having a pair of sections disposed at right angles to the support and secured to the ends thereof and the sections being provided with aligned openings and each section being disposed between the respective pair of plates and pivotally mounted on the plates, a stub shaft arranged at right angles with each support and fixedly secured thereto, a wheel mounted on each stub shaft, a cover for each well positioned longitudinally of the bed and pivotally mounted thereon, two spaced pairs of spaced members disposed transversely of each cover and secured thereto, a bar for each pair of members and having one end pivotally connected to the bed and having its other end movably disposed between the respective pair of members, a link pivotally connected to each bar intermediate its ends and pivotally connected to the respective section on the respective support, a pin for each pair of plates and the respective section, a handle pivotally connected to each pin, a second link for each handle pivotally connected to the handle and the support, each pin projecting through the openings on each pair of plates and the respective section to hold the respective wheel in a vertical position, and means on each support engageable with the respective handle to prevent the respective pin from moving out of the openings in the plates and the respective section, the wheels being movable to a horizontal position under the bed upon the pins being removed from the openings in the plates and sections and the covers moving to a horizontal position to cover the wells to allow a vehicle to be loaded on the first named vehicle, by being moved over the covers.

5. In a vehicle, a bed provided with a pair of opposed wheel wells each extending inwardly from opposite sides thereof, a support disposed in each well and extending longitudinally of the bed and having a pair of spaced sections disposed at right angles to the support and secured thereto and the sections being pivotally mounted on the bed, a stub shaft arranged at right angles with each support and fixedly secured thereto, a wheel mounted on each stub shaft, a cover for each well positioned longitudinally of the bed and having one side pivotally mounted thereon, two spaced pairs of spaced members disposed transversely of the respective cover and secured thereto, a bar for each pair of members and having one end pivotally connected to the bed and having its other end movably disposed between the respective pair of members, and a link having one end pivotally connected to each bar intermediate its ends and having its other end pivotally connected to the respective section on the respective support, the wheels being movable from a vertical position to a horizontal position under the bed and the covers moving from a vertical position to a horizontal position to cover the wells when the wheels are moved to a horizontal position to allow a vehicle to be loaded on the first named vehicle, by being moved over the covers.

6. In a vehicle, a bed provided with a pair of opposed wheel wells each extending inwardly from opposite sides thereof, two spaced pairs of spaced plates disposed adjacent each well and fixedly secured to the bed and each pair of plates being provided with aligned openings, a support disposed in each well and extending longitudinally of the bed and having a pair of spaced sections disposed at right angles to the support and secured thereto, and the sections being provided with aligned openings and each section being disposed between the respective pair of plates and pivotally mounted on the plates, a stub shaft arranged at right angles with each support and fixedly secured thereto, a wheel mounted on each stub shaft, a pin for each pair of plates and the respective section, a handle for each pin and each handle having one end pivotally connected to the respective pin, and a link for each handle having one end pivotally connected to the respective support and having its other end pivotally connected to the respective handle intermediate the ends thereof, each pin projecting through the openings in each pair of plates and the respective section to hold the respective wheel in a vertical position and the wheels being movable to a horizotnal position under the bed upon the pins being moved out of the openings in the plates and sections.

7. In a vehicle, a bed provided with a pair of opposed wheel wells each etxending inwardly from opposite sides thereof, two spaced pairs of spaced plates disposed adjacent each well and fixedly secured to the bed and each pair of plates being provided with aligned openings, a support disposed in each well and extending longitudinally of the bed and having a pair of spaced sections disposed at right angles to the support and secured thereto and the sections being provided with aligned openings and each section being disposed between the respective pair of plates and pivotally mounted on the plates, a stub shaft arranged at right angles with each support and fixedly secured thereto, a wheel mounted on each stub shaft, a pin for each pair of plates and the respective section, a handle for each pin and each handle having one end pivotally connected to the respective pin, a link for each handle having one end pivotally connected to the respective support and having its other end pivotally connected to the respective handle intermediate the ends thereof, each pin projecting through the openings in each pair of plates and the respective section to hold the respective wheel in a vertical position, and means mounted in each support for horizontal sliding movement and engageable with the respective handle to prevent the respective pin from moving out of the openings in the plates and the respective section, the wheels being movable to a horizontal position under the bed upon the pins being moved out of the openings in the plates and sections.

8. In a vehicle, a bed provided with a pair of opposed wheel wells each extending inwardly from opposite sides thereof, a support disposed in each well and extending longitudinally of the bed and having a pair of spaced sections pivotally mounted on the bed, a stub shaft secured to each support, a wheel mounted on each stub shaft, a cover for each well positioned longitudinally of the bed and having one side pivotally mounted thereon, a pair of spaced means disposed transversely of the respective cover and secured thereto with each means forming a guideway, a bar for each means and having one end pivotally connected to the bed and having its other end movably disposed in the respective guideway, and a link pivotally connected to each bar and to the respective section on the respective support, the wheels being movable from a vertical position to a horizontal position under the bed and the covers moving from a vertical position to a horizontal position to cover the wells when the wheels are moved to a horizontal position to allow a vehicle to be loaded on the first named vehicle, by being moved over the covers.

9. In a vehicle, a bed provided with a pair of opposed wheel wells each extending inwardly from opposite sides thereof, spaced plates disposed adjacent each well and secured to the bed and each plate being provided with an opening, said openings being in longitudinal alignment, a support disposed in each well and extending longitudinally of the bed and having a pair of spaced sections and each section being provided with an opening, said openings of the sections being adapted to be positioned in registry with the openings of the plates, means pivotally mounting said sections or said plates, a stub shaft secured to each support, a wheel mounted on each stub shaft, a pin for each plate and the respective section, a handle connected to each pin, each pin projecting through the openings in each plate and the respective section to hold the respective wheel in a vertical position and the wheels being movable to a horizontal position under the bed upon the pins being moved out of the openings in the plates and sections.

References Cited in the file of this patent

UNITED STATES PATENTS

| | | |
|---|---|---|
| 1,159,746 | Clark | Nov. 9, 1915 |
| 2,333,910 | Winters | Nov. 9, 1943 |
| 2,430,742 | Smith | Nov. 11, 1947 |
| 2,468,914 | Banaszak | May 3, 1949 |